United States Patent
Prasad et al.

(10) Patent No.: US 10,523,512 B2
(45) Date of Patent: Dec. 31, 2019

(54) NETWORK AGENT FOR GENERATING PLATFORM SPECIFIC NETWORK POLICIES

(71) Applicant: CISCO TECHNOLOGY, INC., San Jose, CA (US)

(72) Inventors: Rohit Prasad, Sunnyvale, CA (US); Hai Vu, San Jose, CA (US); Shih-Chun Chang, San Jose, CA (US); Hoang Nguyen, San Jose, CA (US); Shashi Gandham, Fremont, CA (US); Navindra Yadav, Cupertino, CA (US); Praneeth Vallem, Sna Jose, CA (US); Sunil Gupta, Milpitas, CA (US); Ravi Prasad, Fremont, CA (US); Varun Malhotra, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 287 days.

(21) Appl. No.: 15/468,642

(22) Filed: Mar. 24, 2017

(65) Prior Publication Data

US 2018/0278478 A1 Sep. 27, 2018

(51) Int. Cl.
*H04L 12/00* (2006.01)
*H04L 12/24* (2006.01)
*H04L 29/06* (2006.01)

(52) U.S. Cl.
CPC ........ *H04L 41/0893* (2013.01); *H04L 63/101* (2013.01)

(58) Field of Classification Search
CPC . H04L 63/20; H04L 63/0227; H04L 41/0893; H04L 41/5006; H04L 63/105;
(Continued)

(56) References Cited

U.S. PATENT DOCUMENTS

| | | | |
|---|---|---|---|
| 5,086,385 A | 2/1992 | Launey et al. | |
| 5,164,988 A * | 11/1992 | Matyas | G06F 21/79 380/279 |

(Continued)

FOREIGN PATENT DOCUMENTS

| | | |
|---|---|---|
| CN | 101093452 | 12/2007 |
| CN | 101770551 | 7/2010 |

(Continued)

OTHER PUBLICATIONS

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

(Continued)

*Primary Examiner* — Frantz Coby
(74) *Attorney, Agent, or Firm* — Polsinelli PC

(57) ABSTRACT

The disclosed technology relates to a network agent for generating platform specific network policies. A network agent is configured to receive a platform independent network policy from a network policy system, determine implementation characteristics of the network entity, generate platform specific policies from the platform independent network policy based on the implementation characteristics of the network entity, and implement the platform specific policies on the network entity.

20 Claims, 9 Drawing Sheets

(58) Field of Classification Search
CPC . H04L 41/0856; H04L 41/046; H04L 63/101; G06F 21/31
USPC ........ 709/203, 220, 223, 225, 227; 370/235, 370/328
See application file for complete search history.

(56) References Cited

U.S. PATENT DOCUMENTS

| | | | |
|---|---|---|---|
| 5,319,754 A | 6/1994 | Meinecke et al. | |
| 5,400,246 A | 3/1995 | Wilson et al. | |
| 5,436,909 A | 7/1995 | Dev et al. | |
| 5,555,416 A | 9/1996 | Owens et al. | |
| 5,726,644 A | 3/1998 | Jednacz et al. | |
| 5,742,829 A | 4/1998 | Davis et al. | |
| 5,822,731 A | 10/1998 | Schultz | |
| 5,831,848 A | 11/1998 | Rielly et al. | |
| 5,903,545 A | 5/1999 | Sabourin et al. | |
| 6,012,096 A | 1/2000 | Link et al. | |
| 6,141,595 A | 10/2000 | Gloudeman et al. | |
| 6,144,962 A | 11/2000 | Weinberg et al. | |
| 6,239,699 B1 | 5/2001 | Ronnen | |
| 6,247,058 B1 | 6/2001 | Miller et al. | |
| 6,249,241 B1 | 6/2001 | Jordan et al. | |
| 6,330,562 B1 | 12/2001 | Boden et al. | |
| 6,353,775 B1 | 3/2002 | Nichols | |
| 6,525,658 B2 | 2/2003 | Streetman et al. | |
| 6,546,420 B1 | 4/2003 | Lemler et al. | |
| 6,597,663 B1 | 7/2003 | Rekhter | |
| 6,611,896 B1 | 8/2003 | Mason, Jr. et al. | |
| 6,654,750 B1 | 11/2003 | Adams et al. | |
| 6,728,779 B1 | 4/2004 | Griffin et al. | |
| 6,735,701 B1 * | 5/2004 | Jacobson ................ | H04L 29/06 726/1 |
| 6,801,878 B1 | 10/2004 | Hintz et al. | |
| 6,816,461 B1 | 11/2004 | Scrandis et al. | |
| 6,822,940 B1 * | 11/2004 | Zavalkovsky .......... | H04L 47/10 370/235 |
| 6,847,993 B1 | 1/2005 | Novaes et al. | |
| 6,848,106 B1 | 1/2005 | Hipp | |
| 6,925,490 B1 | 8/2005 | Novaes et al. | |
| 6,958,998 B2 | 10/2005 | Shorey | |
| 6,983,323 B2 | 1/2006 | Cantrell et al. | |
| 6,996,817 B2 | 2/2006 | Birum et al. | |
| 6,999,452 B1 | 2/2006 | Drummond-Murray et al. | |
| 7,002,464 B2 | 2/2006 | Bruemmer et al. | |
| 7,024,468 B1 | 4/2006 | Meyer et al. | |
| 7,096,368 B2 | 8/2006 | Kouznetsov et al. | |
| 7,111,055 B2 | 9/2006 | Falkner | |
| 7,120,934 B2 | 10/2006 | Ishikawa | |
| 7,133,923 B2 | 11/2006 | MeLampy et al. | |
| 7,162,643 B1 | 1/2007 | Sankaran et al. | |
| 7,181,769 B1 | 2/2007 | Keanini et al. | |
| 7,185,103 B1 | 2/2007 | Jain | |
| 7,203,740 B1 | 4/2007 | Putzolu et al. | |
| 7,237,267 B2 * | 6/2007 | Rayes ..................... | H04L 63/20 713/165 |
| 7,249,187 B2 * | 7/2007 | Sobel ..................... | H04L 63/105 709/227 |
| 7,249,374 B1 * | 7/2007 | Lear ....................... | G06F 21/31 709/203 |
| 7,256,792 B1 * | 8/2007 | Donovan ................ | G06T 15/04 345/428 |
| 7,302,487 B2 | 11/2007 | Ylonen et al. | |
| 7,337,206 B1 | 2/2008 | Wen et al. | |
| 7,349,761 B1 | 3/2008 | Cruse | |
| 7,353,511 B1 | 4/2008 | Ziese | |
| 7,356,679 B1 | 4/2008 | Le et al. | |
| 7,360,072 B1 | 4/2008 | Soltis et al. | |
| 7,370,092 B2 | 5/2008 | Aderton et al. | |
| 7,395,195 B2 | 7/2008 | Suenbuel et al. | |
| 7,444,404 B2 | 10/2008 | Wetherall et al. | |
| 7,466,681 B2 | 12/2008 | Ashwood-Smith et al. | |
| 7,467,205 B1 | 12/2008 | Dempster et al. | |
| 7,496,040 B2 | 2/2009 | Seo | |
| 7,496,575 B2 | 2/2009 | Buccella et al. | |
| 7,530,105 B2 | 5/2009 | Gilbert et al. | |
| 7,539,770 B2 | 5/2009 | Meier | |
| 7,568,107 B1 | 7/2009 | Rathi et al. | |
| 7,610,330 B1 | 10/2009 | Quinn et al. | |
| 7,633,942 B2 | 12/2009 | Bearden et al. | |
| 7,644,438 B1 | 1/2010 | Dash et al. | |
| 7,676,570 B2 | 3/2010 | Levy et al. | |
| 7,681,131 B1 | 3/2010 | Quarterman et al. | |
| 7,693,947 B2 | 4/2010 | Judge et al. | |
| 7,743,242 B2 | 6/2010 | Oberhaus et al. | |
| 7,752,307 B2 | 7/2010 | Takara | |
| 7,774,498 B1 | 8/2010 | Kraemer et al. | |
| 7,783,457 B2 | 8/2010 | Cunningham | |
| 7,787,480 B1 | 8/2010 | Mehta et al. | |
| 7,788,477 B1 | 8/2010 | Huang et al. | |
| 7,808,897 B1 | 10/2010 | Mehta et al. | |
| 7,813,822 B1 | 10/2010 | Hoffberg | |
| 7,844,696 B2 | 11/2010 | Labovitz et al. | |
| 7,844,744 B2 | 11/2010 | Abercrombie et al. | |
| 7,864,707 B2 | 1/2011 | Dimitropoulos et al. | |
| 7,873,025 B2 | 1/2011 | Patel et al. | |
| 7,873,074 B1 | 1/2011 | Boland | |
| 7,874,001 B2 | 1/2011 | Beck et al. | |
| 7,885,197 B2 | 2/2011 | Metzler | |
| 7,895,649 B1 | 2/2011 | Brook et al. | |
| 7,904,420 B2 | 3/2011 | Ianni | |
| 7,930,752 B2 | 4/2011 | Hertzog et al. | |
| 7,934,248 B1 | 4/2011 | Yehuda et al. | |
| 7,957,934 B2 | 6/2011 | Greifeneder | |
| 7,961,637 B2 | 6/2011 | McBeath | |
| 7,970,946 B1 | 6/2011 | Djabarov et al. | |
| 7,975,035 B2 | 7/2011 | Popescu et al. | |
| 8,001,610 B1 | 8/2011 | Chickering et al. | |
| 8,005,935 B2 | 8/2011 | Pradhan et al. | |
| 8,040,232 B2 | 10/2011 | Oh et al. | |
| 8,040,822 B2 | 10/2011 | Proulx et al. | |
| 8,042,148 B2 * | 10/2011 | Andreasen ........... | H04L 63/0227 713/172 |
| 8,056,134 B1 | 11/2011 | Ogilvie | |
| 8,115,617 B2 | 2/2012 | Thubert et al. | |
| 8,117,230 B2 * | 2/2012 | Shaji ..................... | H04L 41/082 707/786 |
| 8,135,657 B2 | 3/2012 | Kapoor et al. | |
| 8,156,430 B2 | 4/2012 | Newman | |
| 8,160,063 B2 | 4/2012 | Maltz et al. | |
| 8,179,809 B1 | 5/2012 | Eppstein et al. | |
| 8,181,248 B2 | 5/2012 | Oh et al. | |
| 8,185,824 B1 | 5/2012 | Mitchell et al. | |
| 8,239,365 B2 | 8/2012 | Salman | |
| 8,239,915 B1 | 8/2012 | Satish et al. | |
| 8,250,657 B1 | 8/2012 | Nachenberg et al. | |
| 8,255,972 B2 | 8/2012 | Azagury et al. | |
| 8,266,697 B2 | 9/2012 | Coffman | |
| 8,272,875 B1 | 9/2012 | Jurmain | |
| 8,281,397 B2 | 10/2012 | Vaidyanathan et al. | |
| 8,291,495 B1 | 10/2012 | Burns et al. | |
| 8,296,847 B2 | 10/2012 | Mendonca et al. | |
| 8,311,973 B1 | 11/2012 | Zadeh | |
| 8,365,286 B2 | 1/2013 | Poston | |
| 8,370,407 B1 | 2/2013 | Devarajan et al. | |
| 8,381,289 B1 | 2/2013 | Pereira et al. | |
| 8,391,270 B2 | 3/2013 | Van Der Stok et al. | |
| 8,407,164 B2 | 3/2013 | Malik et al. | |
| 8,407,798 B1 | 3/2013 | Lotem et al. | |
| 8,413,235 B1 | 4/2013 | Chen et al. | |
| 8,442,073 B2 | 5/2013 | Skubacz et al. | |
| 8,451,731 B1 | 5/2013 | Lee et al. | |
| 8,462,212 B1 | 6/2013 | Kundu et al. | |
| 8,489,765 B2 | 7/2013 | Vasseur et al. | |
| 8,499,331 B1 * | 7/2013 | Yehuda ............... | H04L 41/5006 709/223 |
| 8,499,348 B1 | 7/2013 | Rubin | |
| 8,516,590 B1 | 8/2013 | Ranadive et al. | |
| 8,527,977 B1 | 9/2013 | Cheng et al. | |
| 8,549,635 B2 | 10/2013 | Muttik et al. | |
| 8,570,861 B1 | 10/2013 | Brandwine et al. | |
| 8,572,600 B2 | 10/2013 | Chung et al. | |
| 8,572,734 B2 | 10/2013 | McConnell et al. | |

(56) References Cited

U.S. PATENT DOCUMENTS

| | | |
|---|---|---|
| 8,572,735 B2 | 10/2013 | Ghosh et al. |
| 8,572,739 B1 | 10/2013 | Cruz et al. |
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B1 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar, Sr. et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,433 B1* | 6/2016 | Paul ................... H04L 63/0227 |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0156914 A1* | 10/2002 | Lo ................... H04L 41/0213 709/238 |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0005254 A1* | 1/2006 | Ross ................... H04L 63/0263 726/27 |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |

(56) References Cited

U.S. PATENT DOCUMENTS

| | | |
|---|---|---|
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0156858 A1* | 7/2007 | Sood ............... H04L 63/102 709/220 |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0226775 A1* | 9/2007 | Andreasen ......... H04L 63/0227 726/1 |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0072281 A1* | 3/2008 | Willis ................. G06F 21/577 726/1 |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0284327 A1* | 11/2010 | Miklos ............... H04L 41/0893 370/328 |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0196964 A1* | 8/2011 | Natarajan ........... H04L 41/0604 709/224 |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |

(56) References Cited

U.S. PATENT DOCUMENTS

| | | |
|---|---|---|
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2015/0381423 A1* | 12/2015 | Xiang ............... H04L 41/0893 709/223 |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |

(56) References Cited

U.S. PATENT DOCUMENTS

| | | | |
|---|---|---|---|
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0182351 A1* | 6/2016 | Wang .................. H04L 45/745 709/223 |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308828 A1* | 10/2016 | Lee .................. H04L 63/1441 |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi Ali et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0099188 A1* | 4/2017 | Chang ................ H04L 12/4633 |
| 2017/0208100 A1* | 7/2017 | Lian .................... H04L 63/0263 |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |
| 2018/0176252 A1* | 6/2018 | Nimmagadda ......... H04L 63/20 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18th ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

(56) References Cited

OTHER PUBLICATIONS

Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news.1118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (Globecom 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "Cantina: A Content-Based Approach to Detecting Phishing Web Sites," May 8-12, 2007, pp. 639-648.
Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.

(56) References Cited

OTHER PUBLICATIONS

Zatrochova, Zuzana, "Analysis and Testing of Distributed NoSQL Datastore Riak," Spring, 2015, 76 pages.
Baek, Kwang-Hyun, et al., "Preventing Theft of Quality of Service on Open Platforms," 2005 Workshop of the 1st International Conference on Security and Privacy for Emerging Areas in Communication Networks, 2005, 12 pages.
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Zeng, Sai, et al., "Managing Risk in Multi-node Automation of Endpoint Management," 2014 IEEE Network Operations and Management Symposium (NOMS), 2014, 6 pages.
Arista Networks, Inc., "Application Visibility and Network Telemtry using Splunk," Arista White Paper, Nov. 2013, 11 pages.
Bauch, Petr, "Reader's Report of Master's Thesis, Analysis and Testing of Distributed NoSQL Datastore Riak," May 28, 2015, Brno. 2 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Duan, Yiheng, et al., Detective: Automatically Identify and Analyze Malware Processes in Forensic Scenarios via DLLs, IEEE ICC 2015—Next Generation Networking Symposium, pp. 5691-5696.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1. 0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Voris, Jonathan, et al., "Bait and Snitch: Defending Computer Systems with Decoys," Columbia University Libraries, Department of Computer Science, 2013, pp. 1-25.

\* cited by examiner

Inventory Store

| Entity_ID | Location | OS | Dept. | Interface | Funct. | Annot. | ... | ToR | Scope | ... |
|---|---|---|---|---|---|---|---|---|---|---|
| 1 | MTV | Windows8 | IT | | User PC | | | | | |
| 2 | RTP | Ubuntu | HR | | WebServer | | | | | |
| 3 | MTV | WinServ08 | Finance | | AppServer | | | | | |
| 4 | TX | LinuxVM | IT | | AppServer | | | | | |
| 5 | RTP | PC | Eng. | | User PC | | | | | |
| ... | ... | ... | ... | ... | ... | ... | | ... | | |

300 — Inventory_Filter_1        All inventory items on linux machines in VRF ID 676767

```
"type": "and", "filters": [
    { "type": "regex", "field": "sensors.platform", "value": "linux" },
    { "type": "eq", "field": "vrf_id", "value": "676767" }
]
```

350 — Inventory_Filter_2        End point group representing 10.0.0.0/8 and 1.1.11.0/24 subnets

```
"type": "or", "filters": [
    { "type": "subnet", "field": "ip", "value": "10.0.0.0/8" },
    { "type": "subnet", "field": "ip", "value": "1.1.11.0/24" }
]
```

FIG. 3

```
/* Inventory filter for 10.0.0.0/8: */
    id: 1
    query: { "type": "subnet", "field": "ip", "value": "10.0.0.0/8" }

/* Inventory filter for 11.0.0.1: */
    id: 2
    query: { "type": "subnet", "field": "ip", "value": "11.0.0.1/32" }

/* Flow filter query: */
{
    "type": "and", "filters": [
        { "type": "inventory_filter", "field": "src", "id": "1" },
        { "type": "inventory_filter", "field": "dst", "id": "2" },
        { "type": "eq", "field": "proto", "value": "6" } ]
}
```

405 — Inventory filter for 10.0.0.0/8
410 — Inventory filter for 11.0.0.1
400 — Flow filter query

FIG. 4

NETWORK AGENT FOR GENERATING PLATFORM SPECIFIC NETWORK POLICIES

TECHNICAL FIELD

The subject matter of this disclosure relates in general to the field of computer networks, and more specifically for management of entities and resources within a computer network.

BACKGROUND

A managed network, such as an enterprise private network (EPN), may contain a large number of entities distributed across the network. These entities include, for example, nodes, endpoints, machines, virtual machines, containers (an instance of container-based virtualization), and applications. In addition to being different types, these entities may be grouped in different departments, located in different geographical locations, and/or serve different functions.

An expansive or thorough understanding of the network can be critical for network management tasks such as anomaly detection (e.g., network attacks and misconfiguration), network security (e.g., preventing network breaches and reducing network vulnerabilities), asset management (e.g., monitoring, capacity planning, consolidation, migration, and continuity planning), and compliance (e.g. conformance with governmental regulations, industry standards, and corporate policies). Traditional approaches for managing large networks require comprehensive knowledge on the part of highly specialized human operators because of the complexities of the interrelationships among the entities.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which:

FIG. 2 is an illustration showing contents of an inventory store, in accordance with various embodiments of the subject technology;

FIG. 3 illustrates two examples of inventory filters, in accordance with various embodiments of the subject technology;

FIG. 4 illustrates an example flow filter incorporating two inventory filters, in accordance with various embodiments of the subject technology;

DESCRIPTION OF EXAMPLE EMBODIMENTS

Figure 1:
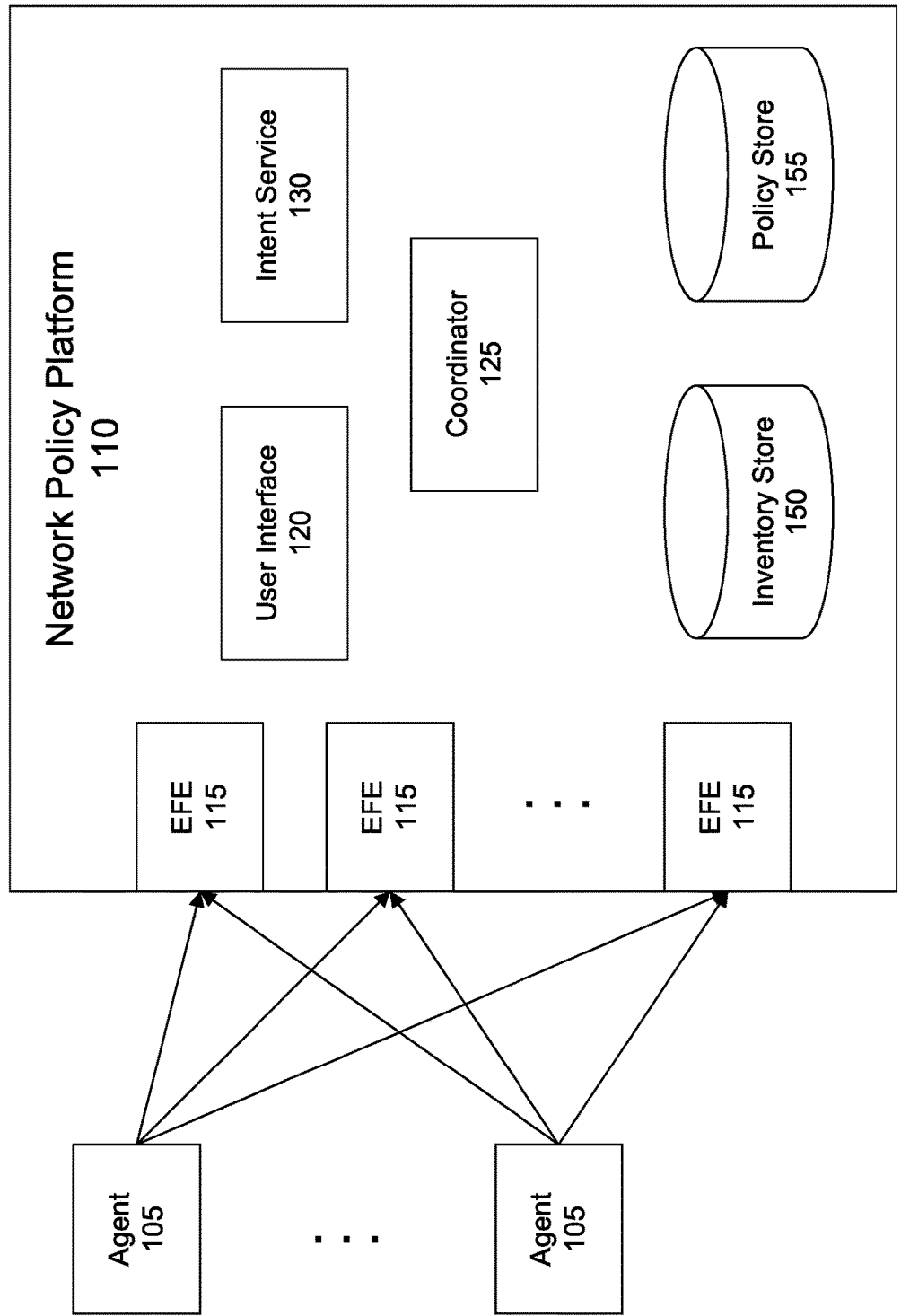
FIG. 1 is a conceptual block diagram illustrating an example of an intent driven network policy platform, in accordance with various embodiments of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Large networks often require comprehensive knowledge on the part of highly specialized human operators (e.g., network administrators) to effectively manage. However, controls available to the human operators are not very flexible and the human operators with the specialized knowledge able to manage the network(s) are often not the individuals with a higher level understanding of how the network should operate with respect to certain applications or functionalities. Furthermore, once a change in network management is executed, it is often difficult to roll back the changes, make alterations, or understand the changes, even for network operators.

The disclosed technology addresses the need in the art for a more intuitive way to manage a network and a way to manage the network in a more targeted manner. For example, many networks may be secured using access control lists (ACLs) implemented by routers and switches to permit and restrict data flow within the network. When an ACL is configured on an interface, the network device examines data packets passing through the interface to determine whether to forward or drop the packet based on the criteria specified within the ACLs. Each ACL includes entries where each entry includes a destination target internet protocol (IP) address, a source target IP address, and a statement of permission or denial for that entry.

The ACLs, however, may be difficult for application developers and other users with limited knowledge of network engineering to understand and use. A development team that builds a particular application, set of applications, or function(s) (e.g., an "application owner") is typically not responsible for managing an enterprise network and are not expected to have a deep understanding of the network. The application owner understands at a high level how certain applications or functions should operate, which entities should be allowed or restricted from communicating with other entities, and how entities should be allowed or restricted from communicating with other entities (e.g., which ports and/or communication protocols are allowed or restricted). In order to implement desired network policies, the application owner must contact a network operator and communicate their objectives to the network operator. The network operator tries to understand the objectives and then creates ACL entries that satisfy the application owner's objectives.

Even relatively simple network policies take hundreds, thousands, or more ACL entries to implement and ACLs often end up containing millions of entries. For example, to implement a simple network rule where a first subnet of machines cannot communicate with a second subnet of machines requires 2(m×n) ACL entries for a number of m endpoints in the first subnet and a number of n endpoints in the second subnet to explicitly list out each IP address in the first subnet that cannot send data to each IP address in the second subnet and each IP address in the second subnet cannot send data to each IP address in the first subnet. The size of the ACLs can further complicate matters making intelligently altering the ACLs increasingly difficult. For example, if an application owner wants to alter the implemented network policies, it is difficult for the application owner or the network operator to know which ACL entries were created based on the original network policy and, as a result, difficult to identify ACL entries to add, delete, or modify based on the alteration of the network policies.

Furthermore, traditional ACLs permit and restrict data flow within the network at the machine level. For example, ACL entries permit or restrict communication based on a destination target internet protocol (IP) address and a source target IP address. However, in some cases, applications on one network entity (e.g., a physical server, virtual machine, container, etc.) should be able to communicate with other applications on a different network entity, but other communications between the entities should be restricted for security reasons (e.g., some hackers may take advantage of broad traditional ACL entries and use applications to gain access to other areas of the network). Traditional ACL entries are unable to accommodate for more tailored control of network traffic.

Various embodiments of the subject technology address these and other technical problems by providing an intent driven network policy platform that allows both application owner and network operators to define network policies in a more understandable manner and provides these users with finer levels of controls.

Detailed Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Various embodiments relate to an intent driven network policy platform configured to ingest network data and generate an inventory of network entities. The network policy platform receives a user intent statement, translates the intent into network policies, and enforces the network policies.

FIG. 1 is a conceptual block diagram illustrating an example network environment 100 that includes an intent driven network policy platform 110, in accordance with various embodiments of the subject technology. Various embodiments are discussed with respect to an enterprise private network (EPN) for illustrative purposes. However, these embodiments and others may be applied to other types of networks. For example, the network environment 100 may be implemented by any type of network and may include, for example, any one or more of a cellular network, a satellite network, a personal area network (PAN), a local area network (LAN), a wide area network (WAN), a broadband network (BBN), the Internet, and the like. The network environment 100 can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

The network environment 100 includes one or more network agents 105 configured to communicate with an intent driven network policy platform 110 via enforcement front end modules (EFEs) 115. The intent driven network policy platform 110 is shown with one or more EFEs 115, a user interface module 120, a coordinator module 125, an intent service module 130, an inventory store 150, and a policy store 155. In other embodiments, the intent driven network policy platform 110 may include additional components, fewer components, or alternative components. The network policy platform 110 may be implemented as a single machine or distributed across a number of machines in the network.

Each network agent 105 may be installed on a network entity and configured to receive network policies (e.g., enforcement policies, configuration policies, etc.) from the network policy platform 110 via the enforcement front end modules 115. After an initial installation on a network entity (e.g., a machine, virtual machine, or container, etc.), a network agent 105 can register with the network policy platform 110 and communicate with one or more EFEs to receive network policies that are configured to be applied to the host on which the network agent 105 is running. In some embodiments, the network policies may be received in a high-level, platform independent format. The network agent 105 may convert the high-level network policies into platform specific policies and apply any number of optimizations before applying the network policies to the host network entity. In some embodiments, the high-level network policies may be converted at the network policy platform 110.

Each network agent 105 may further be configured to observe and collect data and report the collected data to the intent driven network policy platform 110 via the EFEs 115. The network agent 105 may collect policy enforcement related data associated with the host entity such as a number of policies being enforced, a number of rules being enforced, a number of data packets being allowed, dropped, forwarded, redirected, or copied, or any other data related to the enforcement of network policies. The network agent 105 may also collect data related to host entity performance such as CPU usage, memory usage, a number of TCP connections, a number of failed connection, etc. The network agent 105 may also collect other data related to the host such as an entity name, operating system, entity interface information, file system information, applications or processes installed or running, or disks that are mounted.

The enforcement front end modules (EFEs) 115 are configured to handle the registration of the network agents 105 with the network policy platform 110, receive collected data from the network agents 105, and store the collected data in inventory store 150. The EFEs may be further configured to store network policies (high-level platform independent policies or platform specific policies) in memory, periodically scan a policy store 155 for updates to network policies, and notify and update network agents 105 with respect to changes in the network policies.

The user interface 120 receives input from users of the network policy platform 110. For example, the user interface 120 may be configured to receive user configured data for entities in the network from a network operator. The user configured data may include IP addresses, host names, geographic locations, departments, functions, a VPN routing/forwarding (VRF) table, or other data for entities in the network. The user interface 120 may be configured to collect the user configured data and store the data in the inventory store 150.

The user interface 120 may also be configured to receive one or more user intent statements. The user intent statements may be received from a network operator, application owner, or other administrator or through another entity via an application programming interface (API). A user intent statement is a high-level expression of one or more network rules that may be translated into a network policy.

The user interface 120 may pass a received user intent statement to the intent service 130 where the intent service 130 is configured to format the user intent statements and transform the user intent statement into network policies that may be applied to entities in the network. According to some embodiments, the intent service 130 may be configured to store the user intent statements, either in formatted or non-formatted form, in an intent store. After the user intent statements are translated into network policies, the intent service 130 may store the network policies in policy store 155. The policy store 155 is configured to store network policies. The network policies may be high-level platform independent network policies or platform specific policies. In some embodiments, the policy store 155 is implemented as a NoSQL database.

The intent service 130 may also track changes to intent statements and make sure the network policies in the policy store are up-to-date with the intent statements in the intent store. For example, if a user intent statement in the intent store is deleted or changed, the intent service 130 may be configured to located network policies associated with the deleted user intent statement and delete or update the network policies as appropriate.

The coordinator module 125 is configured to assign network agents 105 to EFEs. For example, the coordinator 125 may use a sharding technique to balance load and improve efficiency of the network policy platform 110. The coordinator 125 may also be configured to determine if an update to the policy store is needed and update the policy store accordingly. The coordinator 125 may further be configured to receive data periodically from the network agents 105 via the EFEs 115, store the data in the inventory store 150, and update the inventory store 150 if necessary.

FIG. 2 is an illustration showing contents of an inventory store 200, in accordance with various embodiments of the subject technology. The inventory store 200 is configured to contain data and attributes for each network entity managed by the intent driven network policy platform 110. The network entities may include machines (e.g., servers, personal computers, laptops), virtual machines, containers, mobile devices (e.g., tablets or smart phones), smart devices (e.g., set top boxes, smart appliances, smart televisions, internet-of-things devices), or network equipment, among other computing devices. Although the inventory store 200 is implemented as a conventional relational database in this example, other embodiments may utilize other types of databases (e.g., NoSQL, NewSQL, etc.).

The inventory store 200 may receive user configured data from the user interface 120 and data received from the network agents 105 via the EFEs 115 and store the data in records or entries associated with network entities managed by the network policy platform 110. Each record in the inventory store 200 may include attribute data for a network entity such as one or more entity identifiers (e.g., a host name, IP address, MAC addresses, hash value, etc.), a geographic location, an operating system, a department, interface data, functionality, a list of one or more annotations, file system information, disk mount information, top-of-rack (ToR) location, and a scope.

In some embodiments, the inventory store 200 may also include entity performance and network enforcement data either together with the attribute data or separately in one or more separate data stores. The performance and network enforcement data may include CPU usage, memory usage, a number of TCP connections, a number of failed connections, a number of network policies, or a number of data packets that have been allowed, dropped, forwarded, or redirected. The inventory store 200 may include historical performance or enforcement data associated with network entities or metrics calculated based on historical data.

A user intent statement is a high-level expression of that may be translated into one or more network policies. A user intent statement may be composed of one or more filters and at least one action. The filters may include inventory filters that identify network entities on which the action is to be applied and flow filters that identify network data flows on which the action is to be applied.

For example, if a user wished to identify all network entities located in Mountain View, Calif. (abbreviated MTV in the location column of the inventory store), the inventory filter "Location==MTV" may be used. If a user wished to identify all network entities located in a Research Triangle Park facility in North Carolina (abbreviated RTP in the location column of the inventory store), the inventory filter "Location==RTP" may be used. Inventory filters may also identify relationships between two or more sets of entities (e.g., a union or intersection of sets). For example, if a user wished to identify all network entities located in Mountain View, Calif. and running Windows 8 operating system, the inventory filter "Location==MTV and OS==Windows8" may be used.

A flow filter identifies network data flows. For example, if a user wished to identify all data flows from network entities in Mountain View to network entities in the Research Triangle Park facility, the following flow filter may be used:

Source:Location==MTV
Destination:Location==RTP

Each filter may further be defined beforehand and assigned a name for more convenient use. For example, the inventory filter "Location==MTV" may be assigned the name "MTV_entities" and the inventory filter "Location==RTP" may be assigned the name "RTP_entities." As a result, a user may use the following to achieve the same result as the above example flow filter:

Source:MTV_entities
Destination:RTP_entities

Different actions may be applied to different filters. For example, actions applicable to inventory filters may include annotation and configuration actions. Annotating actions adds tags or labels to network items in the inventory store or flow data. Annotations may help network operators identify network entities. Configuration actions may be used to configure network entities. For example, some configuration actions may be used to set a CPU quota for certain applications, processes, or virtual machines. Other configuration actions may enable or disable monitoring of certain metrics, collection and transmittal of certain data, or enforcement of certain network policies. Some configuration actions may also be able to enable or disable certain modes within a network entity. For example, some entities may be configured to run in a "high visibility mode" in which most metrics and data (e.g., full time series data) are collected and transmitted to the network policy platform for analysis or in "low visibility mode" in which only a small subset of the available metrics and data are collected and transmitted. Some configuration actions are able to enable or disable these modes.

Actions applicable to flow filters may include annotation or network enforcement actions. Network enforcement actions include, for example, allowing data packets, dropping data packets, copying data packets, redirecting data packets, encrypting data packets, or load balance across network entities.

Using the above examples, a user that wishes to drop all data flowing from entities in Mountain View to entities in Research Triangle Park may use the following user intent statement:

Source:MTV_entities
Destination:RTP_entities
Action:Drop

User intent statements may further specify types of communications or communication protocols used, ports used, or use any other filter to identify a network entity or network flow on which to apply an action. For example, if the user only wishes to drop transmission control protocol (TCP) communications out of port 80 for these network entities, the following user intent statement may be used instead:

Source:MTV_entities
Destination:RTP_entities
Action:Drop
Protocol:TCP
Port:80

In another example, to disable all incoming connections to network entities running a Windows 8 operating system, a user can utilize the following user intent statement:

Source:*
Destination:Win8_Filter
Action:Drop

In the above user intent statement, "Win_Filter" is the name of an inventory filter that includes "OS==Windows8."

The example user intent statements above are presented for illustrative purposes. In some embodiments, user intent statements, inventory filters, flow filters, or actions may appear in different formats or even in a natural language format. For example, FIG. 3 illustrates two example inventory filters, in accordance with various embodiments of the subject technology. The first inventory filter 300 is named "Inventory_Filter_1" and is configured to identify all network entities in the inventory store that run on a Linux operating system and have a VRF ID of 676767. The second inventory filter 350 is named "Inventory_Filter_2" and is configured to identify all network entities in the inventory store that represent the 10.0.0.0/8 and 1.1.11.0/24 subnets.

FIG. 4 illustrates an example flow filter incorporating two inventory filters, in accordance with various embodiments of the subject technology. The flow filter 400 is configured to identify TCP data flows between the 10.0.0.0/8 and 11.0.0.1 subnets. The flow filter 400 further uses two inventory filters 405 and 410 to help identify the subnets.

Figure 5:
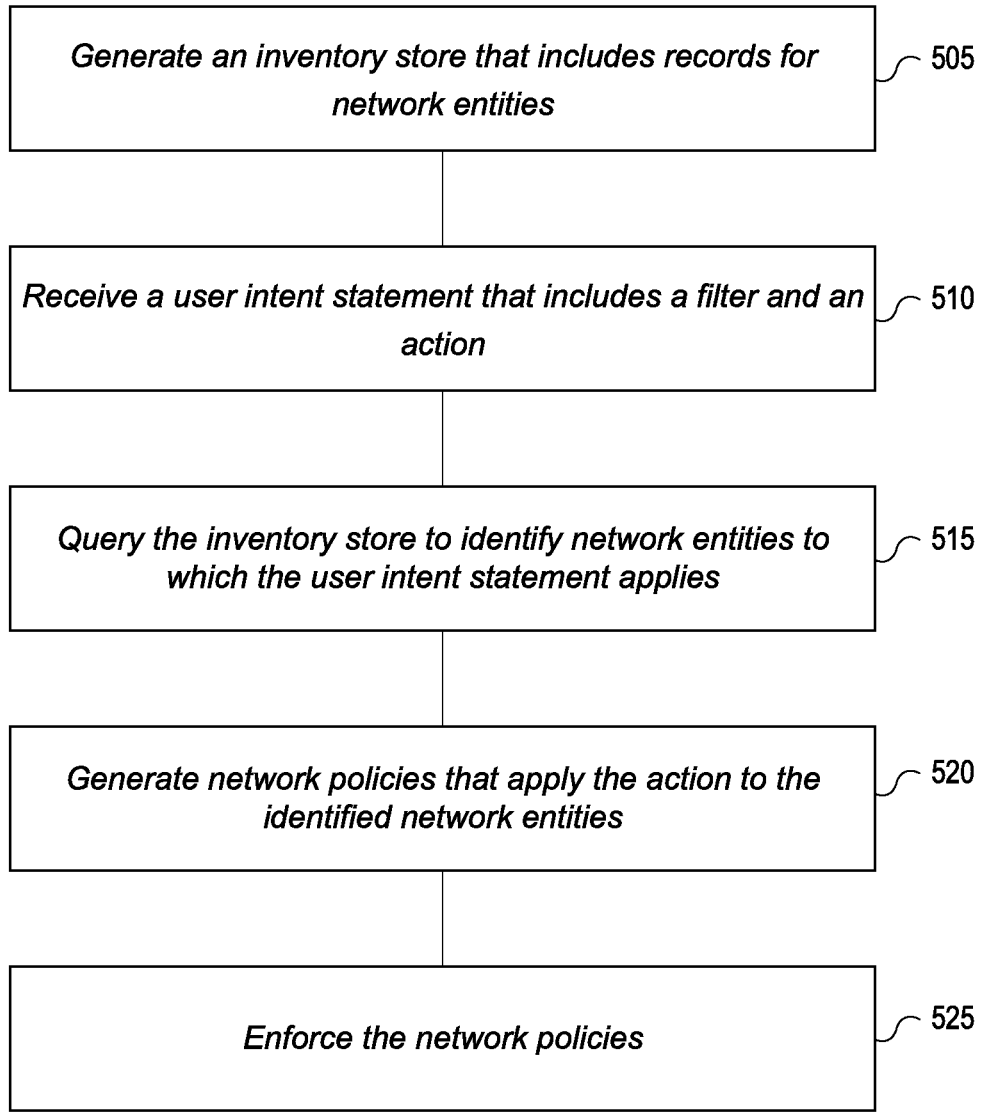
FIG. 5 shows an example process for managing a network using user intent statements, in accordance with various embodiments of the subject technology.

FIG. 5 shows an example process 500 for managing a network using inventory filters, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 500 can be performed by a network, and particularly, a network policy system (e.g., the network policy platform 110 of FIG. 1) or similar system.

At operation 505, the system may generate an inventory store that includes records for network entities in the network. The records may be created or updated based on configuration data received from a network operator. The configuration data may include various attributes of certain network entities. The attributes may include, for example, an internet protocol (IP) address, a host name, a geographic location, or a department. The configuration data may also include annotations, labels, VPN routing/forwarding (VRF) information, interface information, or any other data that may be used to identify one or more network entities.

The records may further be created, updated, or supplemented with information observed by network agents and reported to the network policy system by the network agents. This information may include operating system information, hostnames, interface information, entity identifiers, policy enforcement information, or data related to entity performance. Policy enforcement information may include a number of policies being enforced, a number of rules being enforced, a number of data packets being allowed, dropped, forwarded, redirected, or copied, or any other data related to the enforcement of network policies. Data related to entity performance may include CPU usage, memory usage, a number of TCP connections, a number of failed connection, applications or processes installed or running, disks that are mounted, or other time series data.

At operation 510, the system receives a user intent statement that includes at least one filter and an action. The user intent statement may be received from a network operator, application owner, or other administrator via a user interface or through another party or service via an application program interface (API). The filter may be an inventory filter configured to help identify network entities on which the action is to be applied or a flow filter configured to help identify network data flows on which the action is to be applied. The action may be an enforcement action, a configuration action, or an annotation action.

The system may query the inventory store to identify network entities to which the user intent statement applies at operation 515. For example, system may query the inventory store using the one or more filters found in the user intent statement to identify network entities that match the conditions of the filters. The filters may include one or more attributes that can be used to narrow down the network entities to only those to which the action is to be applied. The attributes may be, for example, an entity type (e.g., machine, virtual machine, container, process, etc.), an IP subnet, an operating system, or any other information that may be found in the inventory store and used to identify network entities.

At operation 520, the system generates network policies that apply the action to the network entities identified by the query. According to some embodiments, the network policies for user intent statements that include a flow filter or an enforcement action may be implemented in the form of one or more access control lists (ACLs). In some embodiments, network policies for user intent statements that include an annotation action or configuration action may be implemented in the form of instructions to the network entity or a network agent to implement the actions.

The system then enforces the network policies at operation 525. According to some embodiments, some network policies may be enforced on the system. However, in some embodiments, the system transmits the network policies to one or more network agents configured to implement the network policies on the network entities.

According to various embodiments of the disclosure, a user or service is able to provide a user intent statement that the system uses to generate multiple network policies. Accordingly, the user need not spend time and resources explicitly crafting each network policy. Instead, the user may specify a reduced number of user intent statements that express the user's network management desires. Furthermore, the user intent statements are more understandable to network operators and application owners and the system is configured to take the user intent statements and translate the statements into network policies that network agents or network entities may use to implement the user's network management desires.

In some embodiments, the user intent statements are translated into platform independent network policies and stored in the policy store. To enforce these network policies, the network policy system transmits the platform independent network policies to network agents running on network entities, where the platform independent network policies are converted into platform specific network policies and implemented.

Figure 6:
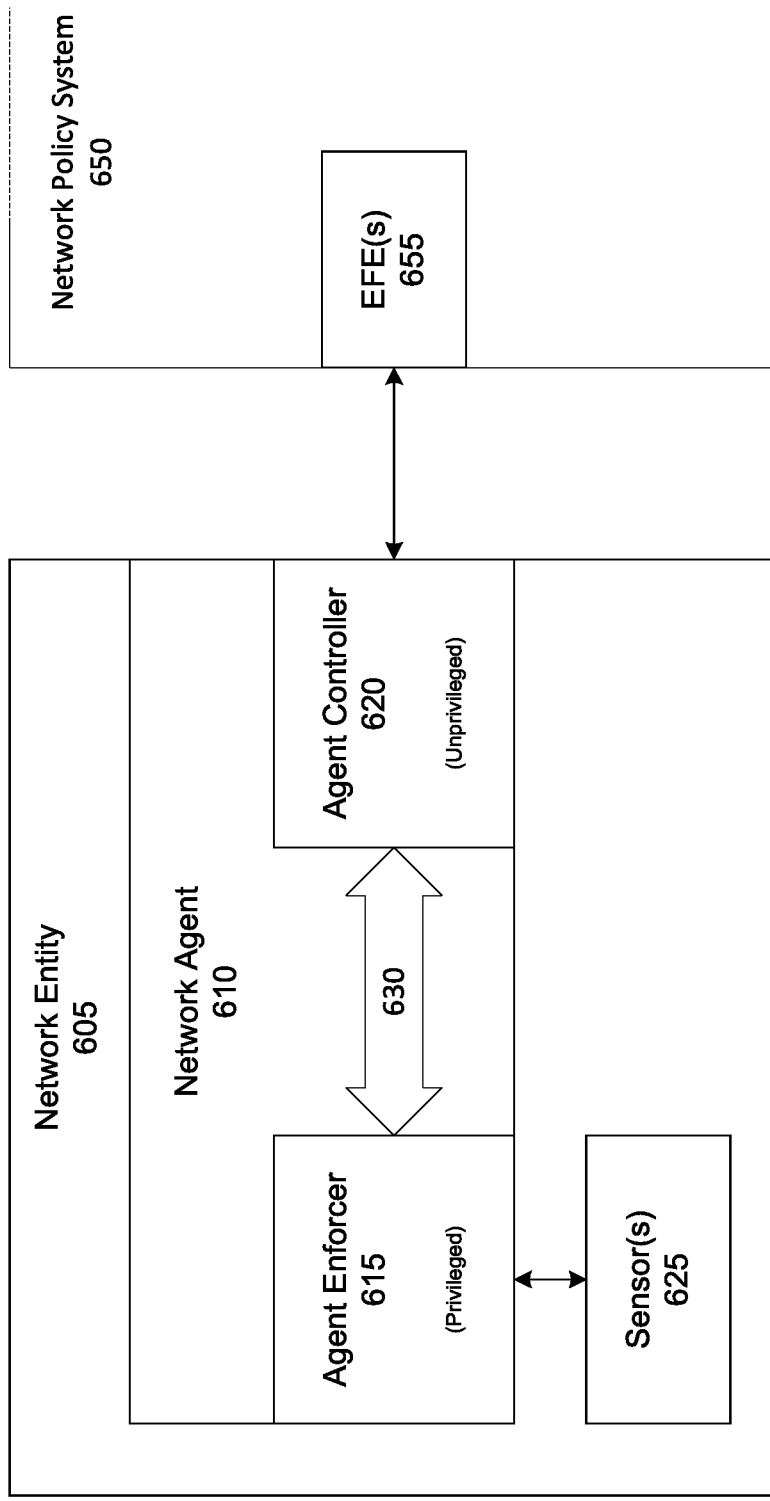
FIG. 6 is a conceptual block diagram illustrating an example of a network entity that includes a network agent, in accordance with various embodiments of the subject technology.

FIG. 6 is a conceptual block diagram illustrating an example of a network entity 605 that includes a network agent 610, in accordance with various embodiments of the subject technology. The network entity 605 may be a physical machine (e.g., a server, desktop computer, laptop, tablet, mobile device, set top box, or other physical computing machine), a virtual machine, a container, an application, or other computing unit. A network agent 610 may be installed on the network entity 605 and may be configured to receive network policies (e.g., enforcement policies, configuration policies, etc.) from the network policy system 650 via one or more enforcement front end (EFE) modules 655.

After an initial installation on a network entity 605, a network agent 610 can register with the network policy system 650. According to some embodiments, the network agent 610 may read the Basic Input/Output System (BIOS) universally unique identifier (UUID) of the network entity 605, gather other host specific information, and access an agent identifier for the network agent 610. The network agent 610 generates a registration request message containing the agent identifier, host specific information (invluding the BIOS UUID) and transmits the registration request message to an EFE module 655. In some cases (e.g., when a network agent is just installed), the network agent 610 may not have an agent identifier. Accordingly, this field in the registration request message may be kept blank until one is assigned.

The EFE module receives the registration request message and, if the request message contains an agent identifier, the EFE module will validate that the BIOS UUID is the same as the BIOS UUID for the entry associated with the agent identifier in the inventory store. If the information matches, the agent identifier in registration request is validated and the network agent 610 is registered. The EFE module may generate a registration response message with the validated agent identifier and transmit the registration response message to the network agent. A BIOS UUID that does not match may indicate that the network agent's identity has changed. Accordingly, the EFE module may generate a new agent identifier, create an entry in the inventory store for the new agent identifier and transmit the new agent identifier to the network agent in the registration response message. If the network agent receives a registration response message that includes an agent identifier which is different from the agent identifier the network agent sent in the registration request message, the network agent will update its agent identifier and adopt the received agent identifier.

An EFE module 655 may send network policy configuration messages as a separate message or part of the registration response message. The network policy configuration messages may contain platform independent network policies to implement on the network entity 605 as well as version information. The network agent 610 receives a network policy configuration message and checks the currently applied policy version. If the policy version for the received network policy configuration message is lower than or equal to the applied version, the network agent 610 does not need to update the applied policies. If, on the other hand, the policy version is higher than the applied version, the network agent 610 will process the received network policy configuration message. In some embodiments, the network policies in the network policy configuration message may be in a platform independent format. The network agent 610 may convert the platform independent network policies into platform specific policies and apply any number of optimizations before applying the network policies to the network entity 605.

The network agent 610 may further be configured to observe and collect data and report the collected data to the network policy system 650 via the EFE modules 655. The network agent 610 may collect policy enforcement related data associated with the host entity such as a number of policies being enforced, a number of rules being enforced, a number of data packets being allowed, dropped, forwarded, redirected, or copied, or any other data related to the enforcement of network policies. The network agent 610 may also collect data related to host entity 605 performance such as CPU usage, memory usage, a number of TCP connections, a number of failed connection, etc.

According to some embodiments, some of the information collected by the network agent 610 may be obtained by one or more sensors 625 of the network entity 605. The sensors 625 may be physical sensors or logical sensors and, in some embodiments, may be a part of the network agent 610 (e.g., a part of the agent enforcer 615 shown in FIG. 6). The network agent 610 may also collect other data related to the host such as an entity name, operating system, entity interface information, file system information, applications or processes installed or running, or disks that are mounted. The network agent 610 may collect the information, store the information, and send the information to an EFE module 655 from time to time.

According to some embodiments, the network agent 610 may be partitioned into two or more portions with varying permissions or privileges in order to provide additional protections to the network entity 605. For example, in FIG. 6, the network agent 610 is shown to include an agent enforcer 615 and an agent controller 620.

The agent controller 620 is associated with an unprivileged status that does not grant the agent controller 620 certain privileges and may be unable to directly access system protected resources. The agent controller 620 is configured to communicate with the EFE modules 655 of the network policy system 650 via a Secure Sockets Layer (SSL) channel and pass critical data to the agent enforcer via an interprocess communication (IPC) channel 630. Interprocess communications (IPC) are communication channels provided by an operating system running on the network entity 605 that enable processes running on the network entity 605 to communicate and share data.

For example, the agent controller 620 may receive platform independent network policies from one or more EFE modules 655 and pass the network policies to the agent enforcer 615 via the IPC channel 630. The agent controller 620 may also receive data collected by the agent enforcer 615 (e.g., policy enforcement related data, data related to entity performance, or other data related to the network entity 605) via the IPC channel 630, generate a message containing the collected data, and transmit the message to one or more EFE modules 655.

The agent enforcer 615 is associated with a privileged status that provides the agent enforcer 615 with additional privileges with respect to the network entity 605. For example, the agent enforcer may directly access or manipulate the network entity's protected resources such as a system firewall, CPU usage, memory usage, sensors 625, or system interfaces. The agent enforcer 615 may be configured to manage registration of the network agent 610 and select which EFE modules 655 with which to communicate. The agent enforcer 615 may further validate network policies received from the network policy system 650 to ensure that the network policies do not violate any sanity checks or golden rules (e.g., a network policy that blocks communication from a port that communicates with EFE modules 655 may be ignored) and translate platform independent network policies received from the network policy system 650 to platform specific policies. The agent enforcer 615 may also maintain a policy cache, enforce platform specific network policies, and determine whether a network policy has been altered. The agent enforcer 615 may also monitors system metrics and policy enforcement metrics so that the data may periodically be sent to the network policy system 650 for analysis.

According to some embodiments, the agent enforcer 615 and the agent controller 620 may run independently and the separation of the agent enforcer 615 and the agent controller 620 allow for a more secure network agent 610 and network entity 605. For example, the agent enforcer 620 may have no external socket connections in order to reduce the number of vulnerable areas that malicious actors (e.g., hackers) may attack. Although the agent controller 620 communicates with the network policy system 650 via a SSL channel, damage caused by the corruption of the agent controller 620 is limited since the agent controller 620 is unable to directly access privileged resources and cannot enforce arbitrary network policies.

Figure 7:
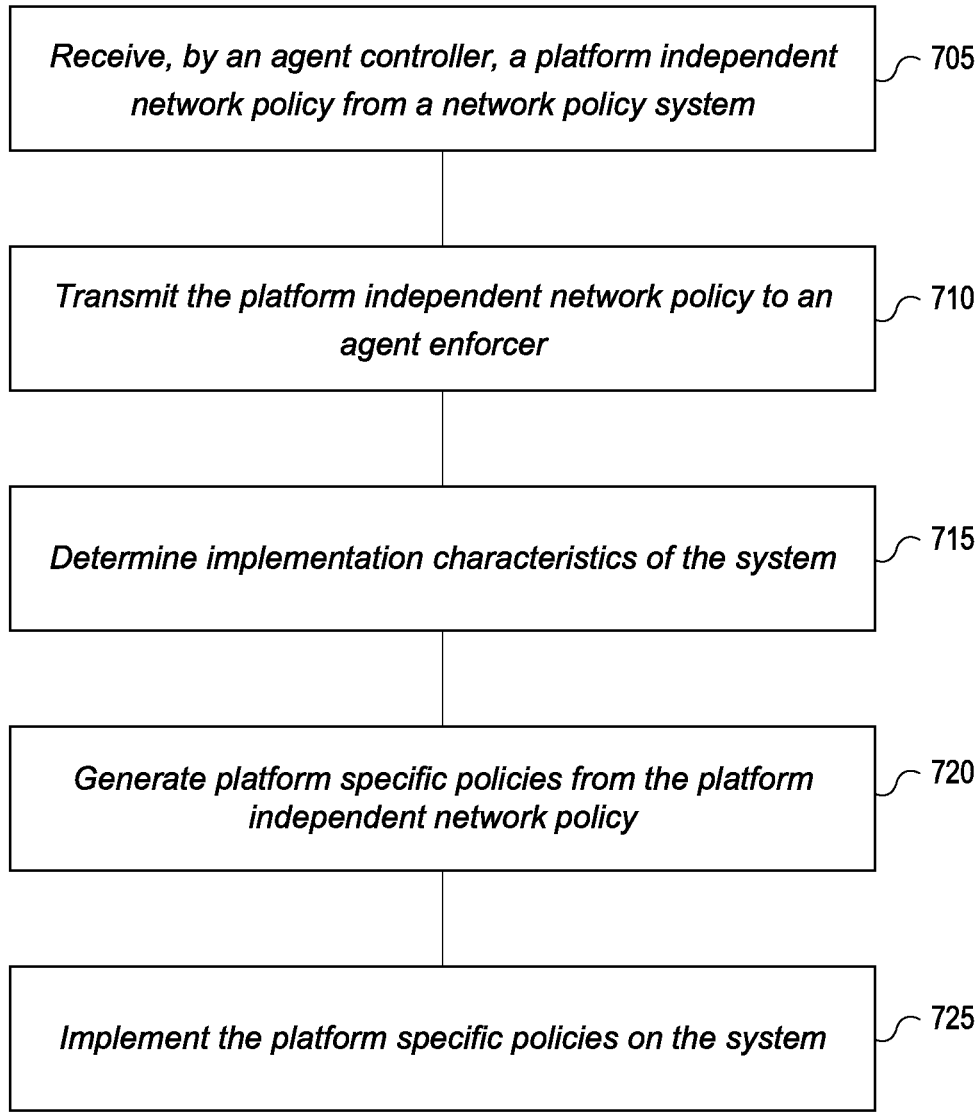
FIG. 7 shows an example process for implementing network policies on a network entity, in accordance with various embodiments of the subject technology.

FIG. 7 shows an example process for implementing network policies on a network entity, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 700 can be performed by a network agent (e.g., the network agent 610 of FIG. 6) or similar system.

At operation 705, an agent controller of the network agent may receive a platform independent network policy from a network policy system. The platform independent network policy may be generated by the network policy system based on, for example, a user intent statement. The agent controller may transmit the platform independent network policy to an agent enforcer via an interprocess communication at operation 710. At operation 715, the agent enforce may determine implementation characteristics of the network entity. The implementation characteristics may include, for example, the operating system information of the network entity, port configurations, storage available to the network entity, accessories attached to the network entity, file system information, applications or processes installed or running on the network entity, etc.

At operation 720, the agent enforcer may generate one or more platform specific policies from the platform independent network policy based on the implementation characteristics and, at operation 725, implement the platform specific policies on the network entity. Once the platform specific policies are implemented, the agent enforcer may further monitor the network entity to collect data to be reported back to the network policy system or to identify policies that have been altered.

An altered network policy may indicate that a user (e.g., a system administrator) or a malicious actor (e.g., a hacker or malicious code) may be trying to change the network policies and a report should be sent to the network policy system for notification purposes. For example, an agent enforcer may identify that a policy in the platform specific policies has been altered and revert the altered policy back to a previous state. The agent enforcer may generate a report detailing the alteration of the network policy and transmit the report, via the IPC channel, to the agent controller where the agent controller may transmit the report to the network policy system.

Figure 8:
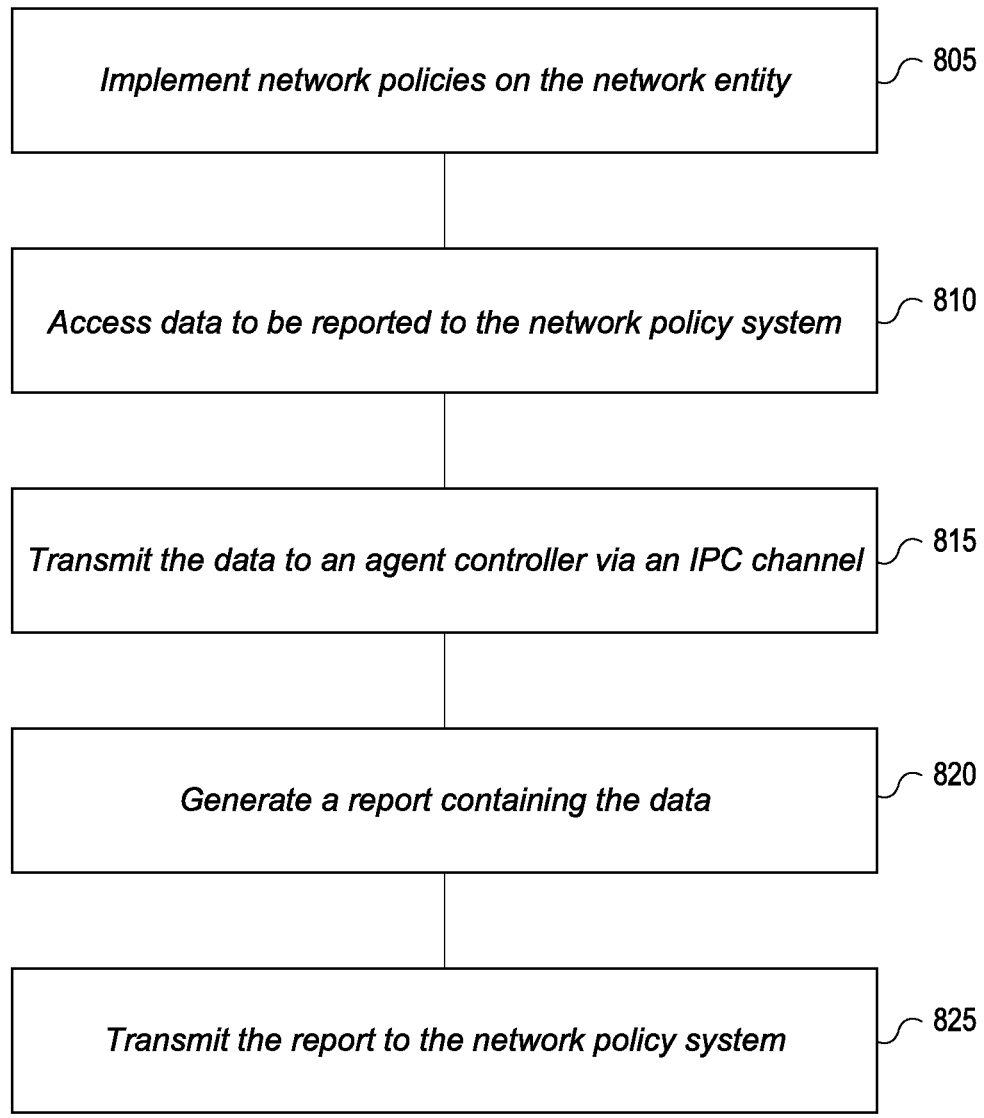
FIG. 8 shows an example process for providing network entity reports to a network policy system, in accordance with various embodiments of the subject technology.

According to some embodiments, the network agent is able to monitor the network entity and collect data to be sent to the network policy system for analysis. FIG. 8 shows an example process for providing network entity reports to a network policy system, in accordance with various embodiments of the subject technology. It should be understood that, for any process discussed herein, there can be additional, fewer, or alternative steps performed in similar or alternative orders, or in parallel, within the scope of the various embodiments unless otherwise stated. The process 800 can be performed by a network agent (e.g., the network agent 610 of FIG. 6) or similar system.

At operation 805, an agent enforcer of a network agent may implement the network policies on the network entity. As described above, the agent enforcer may have a privileged status with respect to the network entity and have permission to take certain actions, access more sensitive resources, and make privileged system calls. The agent enforcer may also be allowed to access certain data that is to be reported to the network policy system at operation 810.

This information may include, for example, policy enforcement data associated with the implementation of the network policies on the network entity, system performance data associated with operation of the network entity, or other entity data. The policy enforcement data may include, for example, a number of policies being enforced, a number of times each network policy is enforced, a number of data packets being allowed, dropped, forwarded, redirected, or copied, or any other data related to the enforcement of network policies. The performance data may include, for example, central processing unit (CPU) usage, memory usage, a number of inbound and/or outbound connections over time, a number of failed connection, etc. Entity data may include, for example, an agent identifier, an operating system, a hostname, entity interface information, file system information, applications or processes installed or running, or disks that are mounted. In some embodiments, one or more sensors are configured to collect and store the data and the agent enforcer is able to access the data via an application programming interface (API) for the sensors.

At operation 815, the agent enforcer may transmit the data to an agent controller on the system via an interprocess communication (IPC) channel. The agent controller receives the data and generates a report that includes the data at operation 820 and transmits the report to the network policy system at operation 825.

According to various embodiments, the network policy system may use the data to provide network administrators with reports on a whole network ecosystem and/or individual network entities. The network policy system may also use the data to monitor network performance, identify threats to the network, and/or manage the network policies for the network. For example, depending on which policy rules being violated and/or whether they are being violated on one, a small group, or across the network, the network policy system may be able to characterize of identify the threat to the network. Based on historical policy enforcement data, the network policy system may be able to determine whether a threat is new or active.

According to some embodiments, the network policy system may determine that a policy is never violated based on the policy enforcement data. The larger number of rules increases the computational overhead of the network, the network policy system, and the network entities. To increase efficiency, the network policy system may remove the policy that is never violated.

Figure 9A:
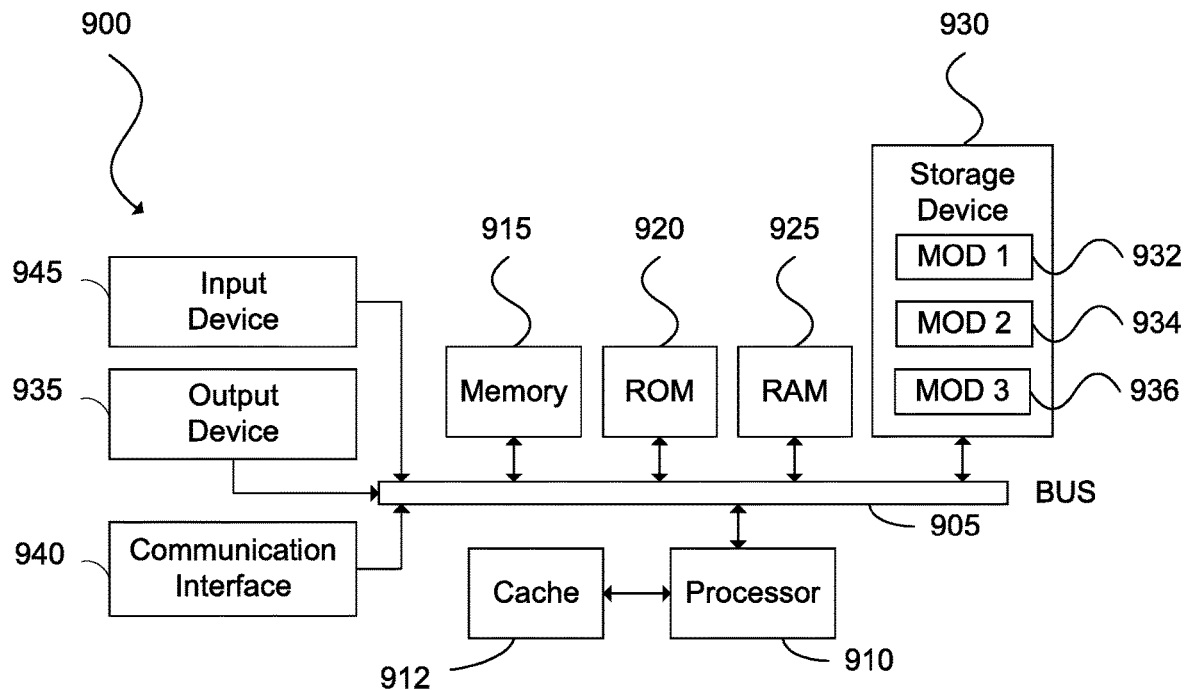
FIGS. 9A and 9B illustrate examples of systems in accordance with some embodiments.
Figure 9B:
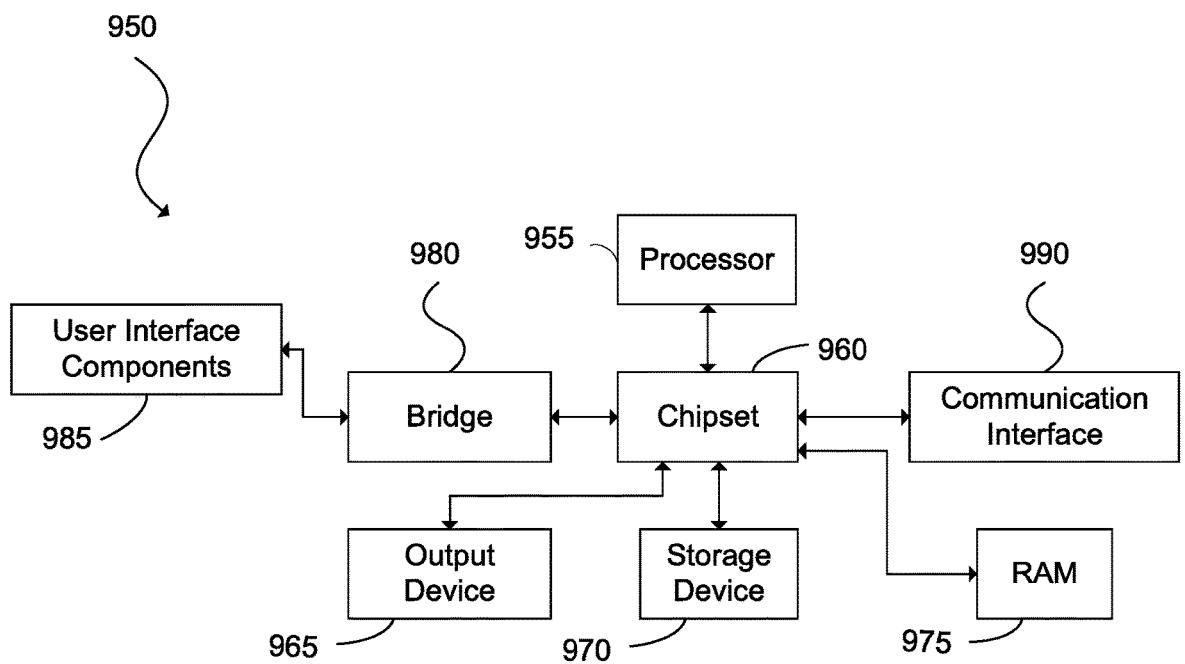

FIG. 9A and FIG. 9B illustrate systems in accordance with various embodiments. The more appropriate system will be apparent to those of ordinary skill in the art when practicing the various embodiments. Persons of ordinary skill in the art will also readily appreciate that other systems are possible.

FIG. 9A illustrates an example architecture for a conventional bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) in a storage device 920 and random access memory (RAM) 925, to the processor 910. The computing system 900 can include a cache 912 of high-speed memory connected directly with, in close proximity to, or integrated as part of the processor 910. The computing system 900 can copy data from the memory 915 and/or the storage device 930 to the cache 912 for quick access by the processor 910. In this way, the cache 912 can provide a performance boost that avoids processor delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

Storage device 930 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, output device 935, and so forth, to carry out the function.

FIG. 9B illustrates an example architecture for a conventional chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, and solid state media, for example. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 955 analyzing data stored in the storage device 970 or the RAM 975. Further, the computing system 900 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system comprising:
   a processor; and
   a non-transitory computer-readable medium storing instructions that, when executed by the system, cause the system to perform operations including:
      receiving, by an agent controller, a platform independent network policy from a network policy system;
      transmitting, via an interprocess communication channel, the platform independent network policy to an agent enforcer on the system, the agent enforcer associated with a privileged status on the system;
      determining, by the agent enforcer, implementation characteristics of the system;
      generating, by the agent enforcer, one or more platform specific policies from the platform independent network policy based on the implementation characteristics of the system; and
      implementing, by the agent enforcer, the one or more platform specific policies on the system.

2. The system of claim 1, wherein the system is one network entity of a plurality of network entities associated with the network policy system.

3. The system of claim 1, wherein the agent controller is associated with an unprivileged status on the system.

4. The system of claim 1, wherein the operations further include:
   identifying, by the agent enforcer, that a policy in the platform specific policies has been altered;
   reverting the policy to an original state;
   generating a report for the policy;
   transmitting, via the interprocess communication channel, the report to the agent controller; and
   transmitting, by the agent controller, the report to the network policy system.

5. The system of claim 1, wherein the platform independent network policy is generated by the network policy system based on a user intent statement.

6. The system of claim 1, wherein the implementation characteristics include at least one of an operating system or entity interface information.

7. The system of claim 1, wherein the operations further include:
   accessing, by the agent enforcer, policy enforcement data associated with the implementing of the one or more platform specific policies on the system;
   transmitting, via the interprocess communication channel, the policy enforcement data to the agent controller on the system,
   generating, by the agent controller, a report including the policy enforcement data; and
   transmitting, by the agent controller, the report to the network policy system.

8. A computer-implemented method comprising:
   receiving, by an agent running on a network entity, a platform independent network policy from a network policy system;
   determining implementation characteristics of the network entity;
   transmitting, by an interprocess communication, the platform independent network policy to an agent enforcer of the network entity, the agent enforcer associated with a privileged status on the network entity;
   generating platform specific policies from the platform independent network policy based on the implementation characteristics of the network entity; and
   implementing the platform specific policies on the network entity.

9. The computer-implemented method of claim 8, wherein, the agent includes an agent controller and the agent enforcer, and the platform independent network policy is received by the agent controller.

10. The computer-implemented method of claim 9, wherein the determining of the implementation characteristics of the network entity, the generating of the platform specific policies, and the implementing of the platform specific policies are performed by the agent enforcer.

11. The computer-implemented method of claim 9, wherein the agent controller is associated with an unprivileged status on the network entity.

12. The computer-implemented method of claim 9, wherein the agent enforcer is associated with a privileged status on the network entity.

13. The computer-implemented method of claim 8, wherein the network entity is one of a host machine, a virtual machine, a container, or an application.

14. The computer-implemented method of claim 8, further comprising accessing policy enforcement data associated with the implementation of the platform specific policies on the network entity;

generating a report including the policy enforcement data; and transmitting the report to the network policy system.

15. A non-transitory computer-readable medium comprising instructions, the instructions, when executed by a computing system, cause the computing system to:

receive, by an agent controller, a platform independent network policy from a network policy system;

transmit, via an interprocess communication channel, the platform independent network policy to an agent enforcer on the computing system, the agent enforcer associated with a privileged status on the computing system;

generate, by the agent enforcer, one or more platform specific policies from the platform independent network policy based on an operating system of the computing system; and implement, by the agent enforcer, the one or more platform specific policies on the system.

16. The non-transitory computer-readable medium of claim 15, wherein the computing system is one network entity of a plurality of network entities associated with the network policy system.

17. The non-transitory computer-readable medium of claim 15, wherein the agent controller is associated with an unprivileged status on the computing system.

18. The non-transitory computer-readable medium of claim 15, wherein the instructions further cause the computing system to:

identify that a policy in the platform specific policies has been altered;

revert the policy to an original state;

generate a report for the policy; and transmit the report to the network policy system.

19. The non-transitory computer-readable medium of claim 15, wherein the platform independent network policy is generated by the network policy system based on a user intent statement.

20. The non-transitory computer-readable medium of claim 15, wherein the instructions further cause the computing system to:

access policy enforcement data associated with implementing the one or more platform specific policies on the computing system;

generate a report including the policy enforcement data; and transmit the report to the network policy system.

* * * * *